(12) United States Patent
Edwards et al.

(10) Patent No.: US 7,031,441 B1
(45) Date of Patent: Apr. 18, 2006

(54) METHOD AND APPARATUS FOR SUPPORTING ON-DEMAND CONNECTIVITY FOR NETWORK APPLICATIONS

(75) Inventors: James W. Edwards, Portland, OR (US); Dan D. Kogan, Portland, OR (US); David B. Andersen, Hillsboro, OR (US); Dale Boss, Portland, OR (US); David Chouinard, Tigard, OR (US); Kevin Hazzard, Beaverton, OR (US); John W. Richardson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 783 days.

(21) Appl. No.: 08/777,543

(22) Filed: Dec. 30, 1996

(51) Int. Cl.
*H04M 1/64* (2006.01)
*H04M 3/00* (2006.01)

(52) U.S. Cl. .............................. 379/88.17; 379/88.11; 379/88.2; 379/88.18; 379/218.01; 379/201.01; 379/265.01; 379/265.09

(58) Field of Classification Search ................ 370/352, 370/356, 353, 380, 389, 392, 396, 401, 404, 370/427, 435, 450, 465, 485; 379/88.17, 379/90.01, 93.01, 93.05, 93.09, 100.15, 100.16, 379/88.11, 88.12, 88.16, 88.18, 218.01, 265.01, 379/265.09
See application file for complete search history.

(56) References Cited

U.S. PATENT DOCUMENTS

| | | | |
|---|---|---|---|
| 4,975,944 A | 12/1990 | Cho | 379/209 |
| 4,995,074 A | 2/1991 | Goldman et al. | 379/97 |
| 5,263,084 A | 11/1993 | Chaput et al. | 379/215 |
| 5,327,486 A * | 7/1994 | Wolff et al. | 379/96 |
| 5,530,852 A * | 6/1996 | Meske, Jr. et al. | 395/600 |
| 5,558,339 A | 9/1996 | Perlman | 463/42 |
| 5,561,709 A | 10/1996 | Remillard | 379/96 |
| 5,572,643 A * | 11/1996 | Judson | 395/793 |
| 5,586,257 A | 12/1996 | Perlman | 463/42 |
| 5,608,446 A * | 3/1997 | Carr et al. | 348/6 |
| 5,608,786 A * | 3/1997 | Gordon | 379/100 |
| 5,661,790 A * | 8/1997 | Hsu | 379/209 |
| 5,692,197 A * | 11/1997 | Narad et al. | 395/750 |
| 5,726,984 A * | 3/1998 | Kubler et al. | 370/349 |
| 5,754,627 A * | 5/1998 | Butler et al. | 379/63 |
| 5,805,587 A * | 9/1998 | Norris et al. | 370/352 |
| 5,809,242 A * | 9/1998 | Shaw et al. | 395/200.47 |
| 5,835,087 A * | 11/1998 | Herz et al. | 345/327 |
| 5,883,891 A * | 3/1999 | Williams et al. | 370/356 |

(Continued)

FOREIGN PATENT DOCUMENTS

EP 0 732 835 A2 3/1996

(Continued)

OTHER PUBLICATIONS

Understanding the Voice-Enabled Internet, First Edition, 1996.*

(Continued)

*Primary Examiner*—Allan Hoosain
(74) *Attorney, Agent, or Firm*—Blakely, Sokoloff, Taylor & Zafman LLP

(57) ABSTRACT

A method and apparatus for supporting on-demand connectivity for network applications is disclosed. Specifically, the present invention discloses a method and apparatus for remotely triggering a connection from a first device to a network. Additionally, a method and apparatus for coordinating application connections is also disclosed. The method comprises the steps of establishing application connections on-demand and managing the application connections.

39 Claims, 6 Drawing Sheets

U.S. PATENT DOCUMENTS

| | | | |
|---|---|---|---|
| 6,009,469 A * | 12/1999 | Mattaway et al. ........... | 709/227 |
| 6,011,794 A * | 1/2000 | Mordowitz et al. ......... | 370/389 |
| 6,078,579 A * | 6/2000 | Weingarten .................. | 370/352 |
| 6,108,704 A * | 8/2000 | Hutton et al. ................ | 709/227 |
| 6,298,120 B1 * | 10/2001 | Civianlar et al. ......... | 379/88.17 |
| 6,343,115 B1 * | 1/2002 | Foladare et al. .......... | 379/88.17 |
| 6,377,576 B1 * | 4/2002 | Zwick et al. ................ | 370/389 |
| 6,385,646 B1 * | 5/2002 | Brown et al. ................ | 709/217 |

FOREIGN PATENT DOCUMENTS

| | | | |
|---|---|---|---|
| WO | WO 97/14234 | * | 4/1997 |

OTHER PUBLICATIONS

Mirabilis, Ltd., Company Profile "The need for better products to establish peer-to-peer communication channels", 3 pp, 1996.

SOLRAM Electronics, Ltd, "Voice and Fax Over the Internet", 8 pp.

"Dialogic-VocalTec server phones home from Net", Erica Schroeder, Boston, MA, 1 pg.

"The COMDEX Series", COMDEX, Fall, 1996 Daily Reports, 2 pp, Jim Boughton.

SOLRAM Electronics Ltd. "Operation Instructions", 2 pp, Dec. 1996.

SOLRAM Electronics Ltd. "Theory of Operation" 2 pp, Dec. 1996.

SOLRAM Electronis Ltd—Home Page, "Talk over the Internet to off-line users, using regular telephone units", 1 pg, Dec. 1996.

SOLRAM Electonics Ltd.—Products "Our Products", 4 pp, Dec. 1996.

SOLRAM Electronics Ltd. "About Internet Telephony", 3 pp. Dec. 1996.

SOLRAM Electronis Ltd. "Press Release", 3 pp, Dec. 1996.

Advanced Digital Systems "Cadet PC Radio AM/FM Data Receiver Card Part # RDX-1187", 1 pg.

SOLRAM Electronics Ltd., "The Technology" 3 pp, Dec. 1996.

International Search Report, PCT/US97/23365, Jul. 20, 1998, 1 pg.

European Office Search Report, dated Oct. 18, 2001, 3 pages.

* cited by examiner

| WWW WHITE PAGES | |
|---|---|
| NAME: | [NAME OF PC 150 USER] |
| ADDRESS: | 123 N.W. LINCOLN AVE.<br>CHEYENNE, WY 12345 |
| E-MAIL: | PC 150 USER@XXX.COM |
| APPLICATIONS: | NETPHONE<br>NETPHOTO<br>PERSONAL WEBSITE |
| | WHITE PAGES WEB PAGES 550 |

FIG. 5B

METHOD AND APPARATUS FOR SUPPORTING ON-DEMAND CONNECTIVITY FOR NETWORK APPLICATIONS

FIELD OF THE INVENTION

The present invention relates to the field of network connectivity. Specifically, the present invention relates to a method and apparatus for supporting on-demand connectivity for network applications.

DESCRIPTION OF RELATED ART

Currently, personal computers (PCs) and other computer devices are actively used for only a few hours a day. This is especially true in the home and small office/home office markets, which constitute the bulk of the current PC market. The current usage model for point-to-point Internet applications is known as "meet and greet" wherein two users who desire to communicate with each other must both be "on" the network with their devices at the same time. "On" the network, in this context, means the users' devices are able to exchange network packets. One of the users must find the other through some means such as a rendezvous service, and both users must have compatible, active applications. For the purposes of this specification, users are described as communicating via applications on PCs on the Internet. It will be apparent to one of ordinary skill in the art, however, that the problems and solutions described herein are equally applicable to other network devices and network environments.

An example of the current point-to-point usage model is illustrated in FIGS. 1A and 1B. For the purposes of illustration, the term "NetPhone" will be used hereafter to refer to a generic Internet telephony application, such as Intel™ Internet Phone and Microsoft™ NetMeeting. FIG. 1A is a typical network connection established between two PCs, PC 100 and PC 150, where PC 100 is dialed into an Internet service provider, ISP A and PC 150 is dialed into another Internet service provider, ISP B. Communication between PC 100 and PC 150 is made possible by their connections to the ISP's on the Internet that provide them with the necessary links to perform their communication. Although PC 100 and PC 150 are described herein as communicating over the Internet and utilizing different ISPs, it will be apparent to one of ordinary skill in the art that the PCs may be communicating over any network, and that if communicating over the Internet, both PCs may be logged into a single ISP. Additionally, either or both PCs may utilize means other than dialing into an ISP to connect to the network, such as a direct Internet connection via a T1 communications line or a Local Area Network (LAN) connection.

FIG. 1B illustrates an alternate scenario that may occur when a user of PC 100 desires to communicate with a user of PC 150. In FIG. 1B, PC 100 is logged into ISP A, but PC 150 is not recognized anywhere on the Internet because PC 150 is not logged into any ISP. The user of PC 100 will therefore not be able to communicate with the user of PC 150 until, and unless, PC 150 connects to the Internet and launches a compatible application to communicate with PC 100. A "compatible" application in the context of this specification is an application that has the ability to communicate with the application on the PC requesting communication. For example, if the user of PC 100 is attempting to communicate with the user of PC 150 via a NetPhone application, a compatible application on PC 150 would include a NetPhone application or an answering machine that can communicate with NetPhone.

The current point-to-point usage model thus presents the following obstacles to current and future Internet applications: i) finding information on desired users and the applications the users have loaded ii) determining whether a desired user's PC is present on the Internet iii) determining the network (e.g. IP) address bound to the user's PC iv) establishing a connection between the desired user's PC and the Internet if the user device is not connected to the Internet, and v) determining whether the PC has compatible applications ready to receive connection requests.

Note that Domain Name Services (DNS) currently exist to provide Internet users with a static list of network addresses associated with particular host devices. As the number of Internet users increases, however, network addresses are more likely to be assigned dynamically rather than statically. If an ISP, for example, were to assign a static network address to each user subscribing to the ISP's service, the ISP would quickly run out of unique network addresses and be unable to support additional users. Instead, ISPs generally assign network addresses to users dynamically, as the users log into the ISPs. The ISP can thus utilize a smaller number of network addresses to support a large number of subscribers because the network addresses can be reused. DNS is therefore clearly not a viable solution for determining the network address assigned to a user by an ISP because the network address may vary each time the user logs in to the ISP.

Due to these obstacles, the growth of potentially promising classes of applications for this market segment has been limited. One such class of applications are applications that provide users on the Internet with complete suites of personal/real-time communications capabilities. Examples of personal/real-time communications capabilities include voice communications, rich messaging, image exchange and games. The interesting characteristics of such applications is that they allow users to actively interact with each other, as opposed to Internet services such as World Wide Web pages. This class of applications would enhance a user's capabilities on the Internet, thus expanding the home and small office/home office user markets.

Removing the obstacles described above would enable users to overcome the "meet and greet" model limitations and establish application connections "on-demand." In the context of this specification, "on-demand" refers to the ability of a user on the Internet to obtain contact information for desired target users, including information pertaining to the applications available to the desired target user, select an application for the selected target user, and then communicate with the target user's application, regardless of whether the target user is currently running that particular application or whether the target user's PC is even present on the Internet.

SUMMARY OF THE INVENTION

This invention discloses a method and apparatus for supporting on-demand connectivity for network applications. Specifically, the present invention discloses a method and apparatus for remotely triggering a connection from a first device to a network. A trigger request is issued for the first device. The trigger request is processed, and then a trigger event is transmitted for the first device, the trigger event being based on the trigger request. Finally, a connection is established from the first device to the network in response to the trigger event.

Additionally, a method and apparatus for coordinating application connections is disclosed. The method comprises the steps of establishing application connections on-demand and managing the application connections.

Other objects, features and advantages of the present invention will be apparent from the accompanying drawings and from the detailed description.

BRIEF DESCRIPTION OF THE DRAWINGS

The present invention is illustrated in the following drawings, in which known circuits or software components are shown in block-diagram form for clarity. These drawings are for explanation and for aiding the reader's understanding. The present invention should not be taken as being limited to the preferred embodiments and design alternatives illustrated.

FIG. 5B illustrates a typical Web page displayed to a user utilizing the present invention.

DETAILED DESCRIPTION OF THE PREFERRED EMBODIMENT

The present invention relates to a method and apparatus for supporting on-demand connectivity for network applications. A "network" in the context of the present specification refers to any means for logically connecting two devices, over which the two devices may communicate. Examples of a network include the Internet, a Local Area Network (LAN) and a Wide Area Network (WAN). The types of application that may utilize the present invention include person-to-person applications (such as Internet phones and Internet games), person-to-information applications (client/server applications such as personal Web sites), call centers (where a user initiates the connection process to a service by clicking on a hyperlink found on a Web page), remote administration services (such as disk backup, remote maintenance, home security or software updates) and Internet appliances (combinations of hardware and software products such as devices that convert a regular analog phone into an Internet phone). It will be apparent to one of ordinary skill that other types of applications may also utilize the present invention.

In the following detailed description, numerous specific details are set forth in order to provide a thorough understanding of the present invention. It will be apparent to one of ordinary skill in the art, however, that these specific details need not be used to practice the present invention. In other instances, well-known structures, interfaces and processes have not been shown in detail in order not to unnecessarily obscure the present invention.

Figure 1A:
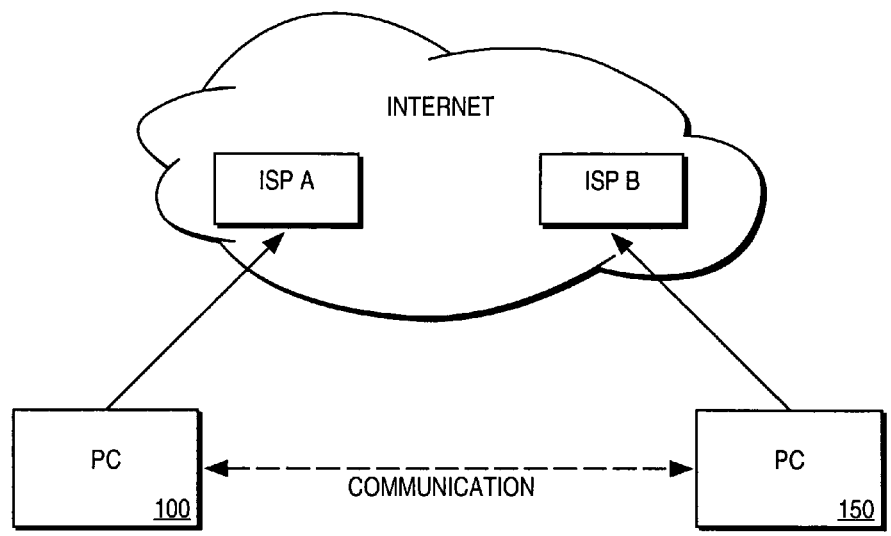
FIGS. 1A and 1B illustrate an example of the current usage model on the Internet.
Figure 1B:
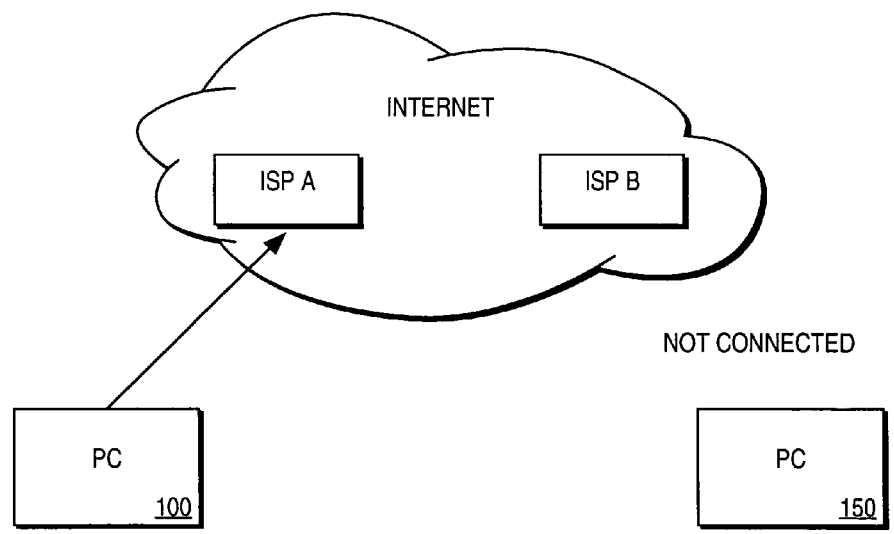
Figure 2:
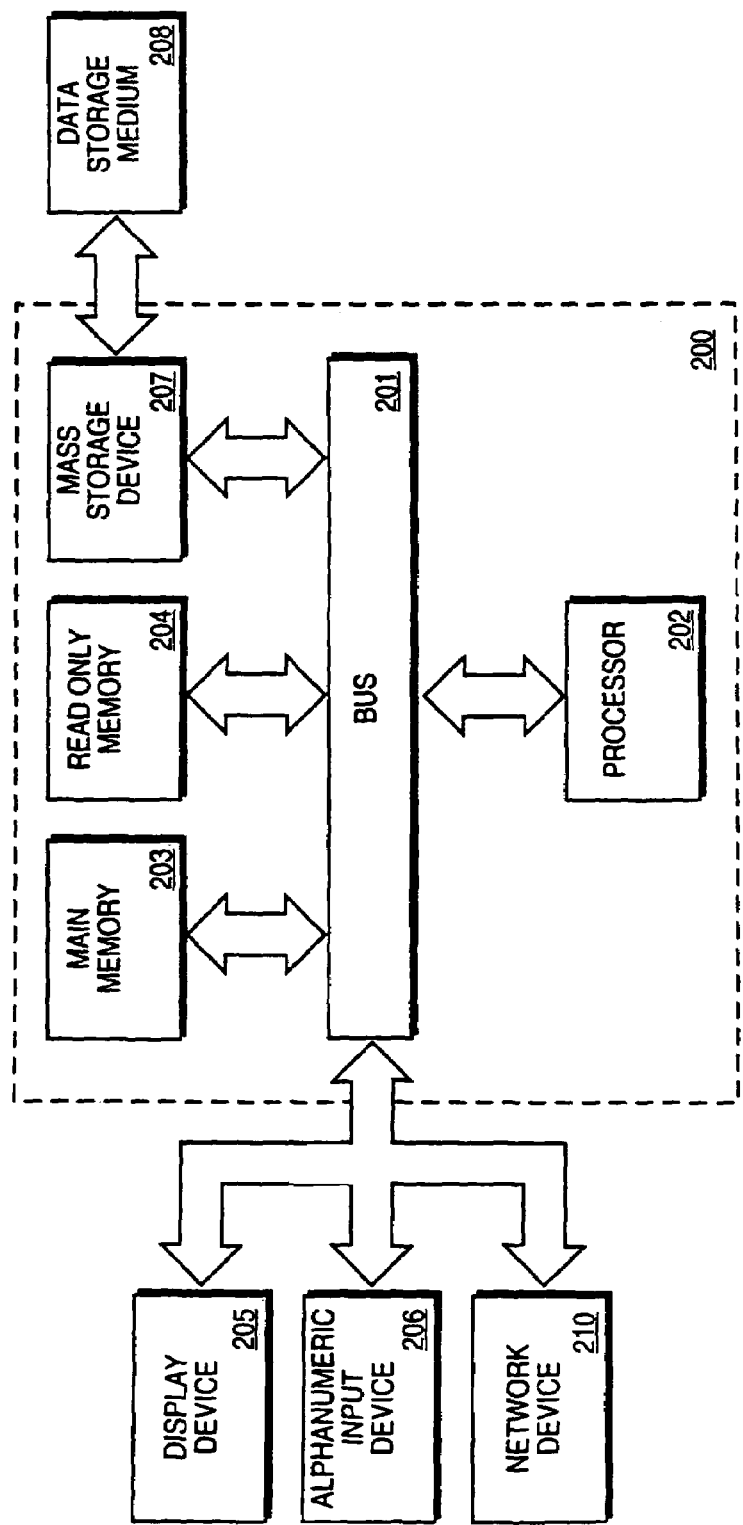
FIG. 2 is an illustration of a typical computer system on which the present invention may be utilized.

FIG. 2 illustrates a typical computer system 200 in which the present invention operates. The preferred embodiment of the present invention is implemented on an IBM™ Personal Computer manufactured by IBM Corporation of Armonk, N.Y. It will be apparent to those of ordinary skill in the art that other alternative computer system architectures may also be employed.

In general, such computer systems as illustrated by FIG. 2 comprise a bus 201 for communicating information, a processor 202 coupled with the bus 201 for processing information, main memory 203 coupled with the bus 201 for storing information and instructions for the processor 202, a read-only memory 204 coupled with the bus 201 for storing static information and instructions for the processor 202, a display device 205 coupled with the bus 201 for displaying information for a computer user, an input device 206 coupled with the bus 201 for communicating information and command selections to the processor 202, and a mass storage device 207 coupled with the bus 201 for storing information and instructions. A data storage medium 208, such as a magnetic disk and associated disk drive, containing digital information is configured to operate with mass storage device 207 to allow processor 202 access to the digital information on data storage medium 208 via bus 201.

Processor 202 may be any of a wide variety of general purpose processors or microprocessors such as the Pentium™ brand processor manufactured by Intel™ Corporation. It will be apparent to those of ordinary skill in the art, however, that other varieties of processors may also be used in a particular computer system. Display device 205 may be a liquid crystal device, cathode ray tube (CRT), or other suitable display device. Mass storage device 207 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 208 may be a hard disk, a floppy disk, a CD-ROM, a magnetic tape, or other magnetic or optical data storage medium.

In general, processor 202 retrieves processing instructions and data from a data storage medium 208 using mass storage device 207 and downloads this information into random access memory 203 for execution. Processor 202, then executes an instruction stream from random access memory 203 or read-only memory 204. Command selections and information input at input device 206 are used to direct the flow of instructions executed by processor 202. Equivalent input device 206 may also be a pointing device such as a conventional mouse or trackball device. The results of this processing execution are then displayed on display device 205.

Computer system 200 includes a network device 210 for connecting computer system 200 to a network. The network device 210 for connecting computer system 200 to the network includes Ethernet devices, data modems and ISDN adapters. It will be apparent to one of ordinary skill in the art that other network devices may also be utilized.

The preferred embodiment of the present invention is implemented as a software module, which may be executed on a computer system such as computer system 200 in a conventional manner. Using well known techniques, the application software of the preferred embodiment is stored on data storage medium 208 and subsequently loaded into and executed within computer system 200. Once initiated, the software of the preferred embodiment operates in the manner described below.

Figure 3A:
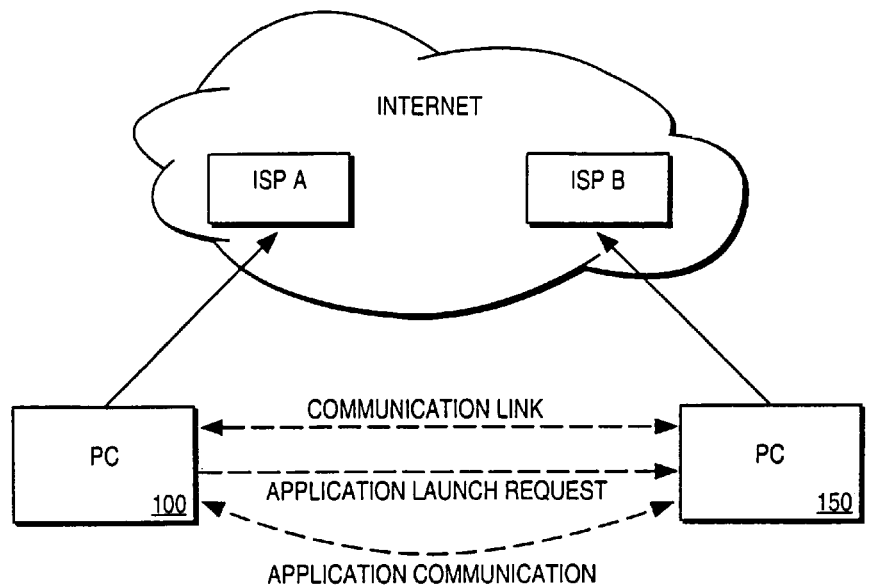
FIGS. 3A and 3B illustrate an overview of the claimed invention.
Figure 3B:
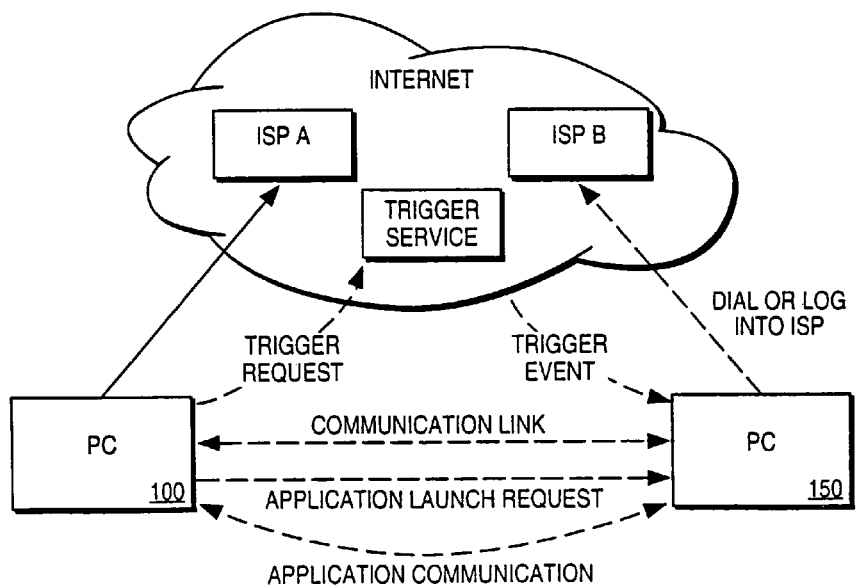

FIGS. 3A and 3B illustrate an overview of the method and apparatus for supporting on-demand connectivity of network applications, as claimed in the present invention. FIG.

3A illustrates a situation in which PC 100 is logged into ISP A, while PC 150 is logged into ISP B on the Internet. The user of PC 100 may desire to communicate with the user of PC 150 via a specific application, such as NetPhone. Although PC 150 is logged into ISP B, the user of PC 100 still may not be able to communicate with the user of PC 150 via NetPhone if the user of PC 150 does not have NetPhone activated.

In this example, according to one embodiment of the present invention, PC 100 obtains the network address for PC 150 from an address resolution service, described in more detail below, and attempts to communicate with the user of PC 150 via a specific application. If NetPhone on PC 150 is activated, then a communications channel is opened up between PC 100 and PC 150 and the applications can communicate. Otherwise, if NetPhone on PC 150 is not running, PC 100 issues an application launch request to PC 150. An application launch request is a request from PC 100 to PC 150 that specifies an application to activate. The request will be processed according to the method and apparatus described below, and ultimately, the application (NetPhone in this example) will be automatically launched on PC 150, and the user of PC 100 will be able to communicate with the user of PC 150. It will be apparent to one of ordinary skill in the art that the application activated at PC 150 may also run in an unattended mode (e.g. a client/server scenario such as a personal website or answering machine application).

FIG. 3B illustrates an alternative scenario, namely one in which PC 100 is logged into ISP A and the user of PC 100 desires to communicate with the user of PC 150, where PC 150 is not logged into ISP B or any other ISP on the Internet. According to an embodiment of the present invention, when PC 100 determines that PC 150 is not logged into the Internet, PC 100 issues a trigger request to a trigger service (described below) on the Internet. PC 150 must have previously subscribed to this trigger service. Alternately, although the following description assumes that the trigger service resides on the Internet, the trigger service may be located on PC 100 instead or elsewhere off the network.

In the scenario illustrated in FIG. 3B, when PC 100 issues a trigger request to PC 150's trigger service, the trigger service generates a previously agreed upon trigger event to PC 150. A trigger listener software component on PC 150 detects this trigger event and in response logs onto PC 150's designated ISP. At this point PC 150 is assigned a network address. After PC 150 is successfully logged into ISP B, another software component on PC 150, namely an application agent, described in detail below, registers with PC 150's address resolution service. The application agent of PC 100 is then aware that PC 150 is logged onto the Internet and can obtain PC 150's network address from PC 150's address resolution service. This allows the users of PC 100 and PC 150 to meet "on demand," instead of having to wait until both PCs happen to be on the network at the same time. Note that although the description above and below assumes that PC 150 establishes a connection or becomes active immediately upon receipt of the trigger event, PC 150 may also be configured to log the trigger event and schedule a deferred response, or to ignore certain trigger events altogether.

Although the previously described embodiment relies on various services on the Internet, the present invention may be practiced without the Internet services. For example, trigger requests may be generated independently of the trigger service on the Internet. In this alternate embodiment, either PC 100 or a device external to PC 100 and the Internet can issue a trigger event for PC 150 that causes PC 150 to be connected on-demand to PC 100, thus allowing applications on PC 100 to communicate with applications on PC 150. Note that although the trigger request is described as an explicit request in the above and following descriptions, the trigger request may also be implicit. An example of an implicit trigger request includes a router that dials out in response to a network packet addressed to a specified static network address. In this case, the client may be configured to ignore or reject the call and instead treat the connection request as a trigger event (described below). In this scenario, the trigger request is implicit (in the connection request from the router) rather than explicit. It will be apparent to one of ordinary skill in the art that implicit trigger requests may also be utilized with a variety of other devices that support functionality similar to the router described above.

According to an alternate embodiment of the present invention, PC 100 is logged into ISP A and is currently active, while PC 150 is persistently logged into a LAN (or possibly an ISP such as ISP B), but is not active. PC 150 may be "power managed," thus seeming like it is unavailable for communication on the Internet. A "power managed" PC according to this invention includes PCs that are capable of automatically managing their mode of operation, thus functioning in full power mode when the PC is actively being used, and in low power mode when the PC is idle. In either case, the PC is logged into a network, but while in low power mode, the "power managed" PC may seem to other users on the Internet to be unavailable for communication purposes. According to this embodiment, PC 100 issues a trigger request to a trigger service that generates a previously agreed upon trigger event to PC 150. The trigger event in this embodiment is a special network packet that causes PC 150's network card to wake up the rest of the system. Specifically, PC 150's network hardware detects this trigger event and in response, activates PC 150 by interrupting the power managed mode. PC 150 thus becomes active once again on the Internet, and the user of PC 100 can now communicate with the user of PC 150.

Figure 4A:
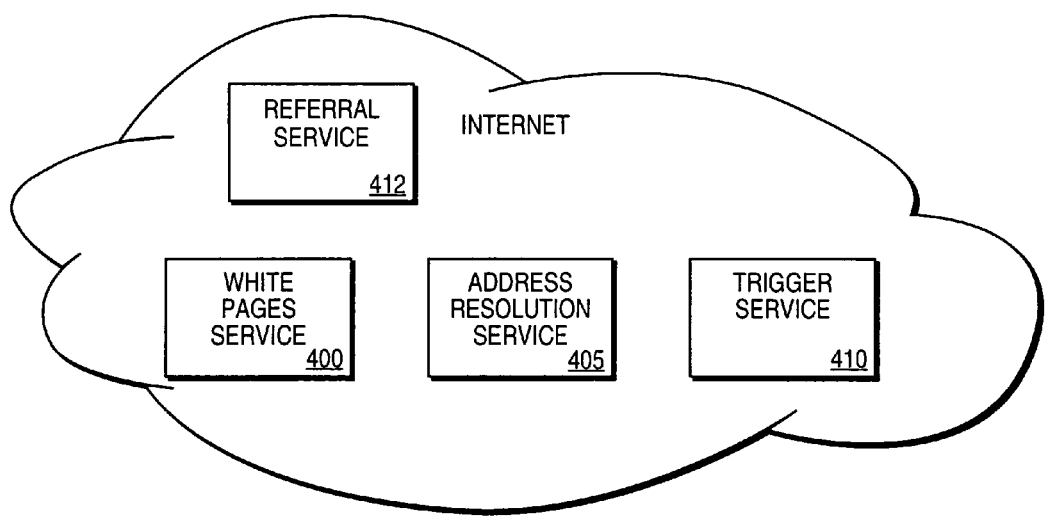
FIG. 4A illustrates in more detail the services available on the Internet to enable the claimed invention.

FIG. 4A illustrates the services on the Internet according to one embodiment of the present invention. These services include white pages service 400, address resolution service 405, trigger service 410 and referral service 412. Each service is described in further detail below.

White pages service 400 on the Internet typically maintains databases on people and/or businesses that may be accessed by Internet users with a Web browser. Typically, an Internet user finds information on a desired person or business by entering in selected information such as a name or a city into a query form on one of the Web pages for white pages service 400. Once the query is submitted, the service searches its databases and returns matching entries on people or businesses. Examples of white pages service 400 include Infospace™ at http://www.infospace.com and Four11™ at http://www.four11.com. Other white pages service 400 or similar services providing equivalent functionality may also be utilized.

White pages service 400 and address resolution service 405 are well known to those of ordinary skill in the art. Further details regarding address resolution service 405 are also described below. One embodiment of the present invention is based on those conventional services, with white pages service 400 being modified to integrate with an address resolution service 405 and a trigger service 410. White pages service 400 can store links, for example Uniform Resource Locators (URLs), for a user's trigger service and address resolution service. White pages service 400 is not aware of the details of this link, such as the type of service or Web pages associated with the link. The address resolution service and the trigger service are logically independent services that do not need to know any details about each other.

According to one embodiment of the present invention, the entries for people in a white pages services database must include additional fields in user entries that can be used to store links such as URLs, in particular, one URL for each of the user's Internet applications that the user desires to make known to other Internet users. These links are referred to as application contact links. The information they embed is referred to as an application's contact information. Activating one of the application contact links results in an HTTP-based "resolve request" to address resolution service 405. HTTP (HyperText Transport Protocol) is a communications protocol that allows Web clients to communicate with Web servers. The resolve request is described in more detail below. It will be apparent to one of ordinary skill in the art that a white pages service is only one way to obtain information about PC 150 on the Internet. Other possible alternatives include PC 100 maintaining a local address book (possibly Hyper-Text Markup Language (HTML) based) containing application contact information for other users, or PC 150 providing its own application contact information via its own Web page.

Address resolution service 405 on the Internet acts as a rendezvous point, allowing a user to determine if a target user's PC is currently on the Internet. If the target user's PC is currently on the Internet, address resolution service 405 also allows the first user to determine the target user's current assigned network address. Address resolution service 405 typically maintains a database of entries. Entries may be dynamically added, removed or accessed. As described above, an application contact link from a user's white pages entry can be invoked to issue an HTTP-based resolve request against the user's address resolution service. The resolve request is a request to address resolution service 405 to correlate a user and application with a network address and to provide the network address to the requester. Thus, the combination of white pages service 400 (or equivalent) and a user's address resolution service 405 is the basis for deducing whether a target user is currently on the Internet and to resolve from a target user and application to the target user's current assigned network address. An example of an address resolution service 405 that exists today is Microsoft Corporation's User Locator Service (ULS). Various other white page service 400 vendors have also implemented address resolution service 405. It will be apparent to one of ordinary skill in the art that address resolution service 405 may be based on network protocols other than HTTP. An example of another network protocol that can be used for address resolution service 405 is LDAP (Lightweight Directory Access Protocol).

Trigger service 410 is a component that does not exist on the Internet today. According to one embodiment of the present invention, a trigger URL is used to invoke a trigger request for a given user. This URL is embedded in each of the application contact links within a user's white pages entries, as described above. In response to "HTTP-based" trigger requests that come across the Internet, trigger service 410 generates a trigger event that causes a specified user's PC to automatically establish a dial-up networking connection to an ISP or to wake up from a low power state. Trigger events are discussed in further detail below. It will be apparent to one of ordinary skill in the art that trigger requests may also be based on other network protocols.

Referral service 412 is a component that does not exist on the Internet today. Referral service 412 supports the process of call referrals so that the application contact process for a target user can be selectively redirected from one PC location to another PC location. This is analogous to call forwarding in the standard telephony environment, only with much greater selectivity. Referral service 412 can also support selective call blocking to prevent calls from selected users or for a specific application from proceeding any further. Referral service 412 implements a database that can be used to access entries that store call referral mapping information. These entries are associated with specific users and each entry contains information on how to map a call for a user and application from one PC location to another PC location. This database allows users to add/delete entries so that a user may in effect administer the call referrals.

Referral service 412 also supports a refer operation that maps a given user, application, and PC location to another PC location. Refer operations can be invoked via a refer URL. Similar to trigger URLs, refer URLs can be embedded in each of the application contact links within a user's white pages entries, as described previously. It will be apparent to one of ordinary skill in the art that refer operations may also be based on other network protocols. Referral service 412 may also be located on or off the network. An example of a referral service 412 that is located off the network is one that resides on the callee's PC.

Each of the services is illustrated and described above as a logically separate service. The services may, however, be co-located in any combination or placed at separate locations. Furthermore, the services may be linked logically, i.e. invoking one service may invoke another. For example, in the following description, address resolution service 405 and trigger service 410 may be combined such that if a resolve request (described below) fails at a user's address resolution service 405, address resolution service 405 may use information provided in the request to invoke the user's trigger service. Address resolution service 405 waits until the target user is on the Internet and then returns success to the resolve requester.

Figure 4B:
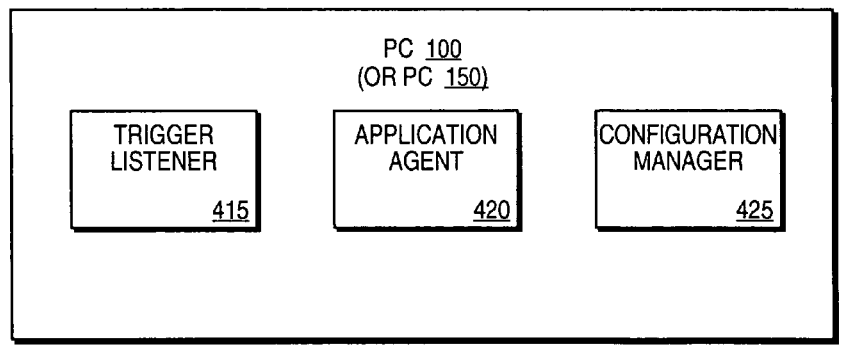
FIG. 4B illustrates in more detail the software components available on the client PC's to enable the claimed invention.

FIG. 4B illustrates the software components that exist on the devices that desire to communicate with each other utilizing the claimed invention. These devices may be PCs, as used in the examples above, and as illustrated in FIG. 2. It will be apparent to one of ordinary skill in the art, however, that other devices that are capable of communicating via a network may also utilize the claimed invention. The software components on these devices include trigger listener 415, application agent 420 and configuration manager 425.

Trigger listener 415 is a software process that listens for incoming "events" generated by a trigger service on the Internet. If an incoming event matches a user-specified pattern, trigger listener 415 establishes a dial-up networking connection to a user-specified ISP. A dial-up networking connection can be established over any type of switched circuit technology such as a POTS line or an ISDN B-channel.

Trigger events may be generated via a number of technologies including switched circuit lines, wireless signals and other similar communications technologies. Any triggering technology that can be detected at a user's PC is suitable for conveying a trigger event. The trigger listener may support one or more of any of these trigger technologies and may be user-configurable to allow flexibility on the events responded to and the ISP which is dialed.

Examples of switched circuit technologies that are suitable for triggering include POTS and ISDN. For switched circuit lines, an incoming call or signaling is used to convey a trigger event. For triggering based on a regular POTS line, a trigger event may consist of an incoming caller ID from a specific phone number (e.g. the trigger service), distinctive ringing, number of rings followed by a prescribed idle period (most likely case is simply one ring to minimize the possibility of an end-user picking up the phone), or combinations of these. For triggering based on ISDN, a trigger event may consist of a caller ID, a called ID, a sub-address, user-to-user signaling or combinations of these. User configuration of one or more of these possibilities is referred to as the trigger pattern. In POTS triggering, the trigger listener does not answer the incoming call that contains the trigger event. Instead, the trigger listener waits to generate the resulting outgoing call to an ISP only after the line has returned to an idle state. In ISDN triggering, the trigger listener rejects the incoming call containing the trigger event and generates an outgoing call to the ISP.

Examples of wireless technologies that are suitable for triggering include the vertical blanking interval (VBI) of a television signal (e.g. Intel's Intercast), FM subcarrier channels, sattelite broadcasting and paging. Each of these technologies is used to convey a trigger event message to a user's PC. In general, these technologies are broadcast mechanisms and there must be some means for distinguishing a trigger event message from other types of messages and to determine the target user(s) for the message.

Application agent 420 is a software process. Application agent 420 has overall responsibility for orchestrating the complex process of getting selected users' applications communicating with each other in a transparent, seamless fashion. During the potentially lengthy process of getting users' applications connected, application agent 420's user interface may keep the user abreast of current status by displaying appropriate call progress status.

After an initial application connection is established between two endpoints, application agent 420 manages sessions during which users at either endpoint may launch subsequent applications. Application launching policy is configurable by the user on a per application basis and includes such elements as what types of notifications are presented to the user for application launch requests and how to respond to application launch requests when a user is not present. The application agents 420 on each endpoint may exchange application information automatically or under the direct control of the user. Some of the applications may not be visible to the users via white pages service 400. In this manner, application agent 420 allows users to make applications privately available to specified users and not generally available via white pages service 400. Application agents 420 run as peers between two endpoints and communicate via a simple protocol. This protocol issues a launch application request from the caller's endpoint, and in response, the callee's endpoint issues a launch application response, where the response may include acceptance of the request (thus launching the application), rejection of the request, or an authentication request to the first endpoint in order to complete launching the application.

Configuration manager 425 supports standard interfaces for local and remote configuration of various entities including: collecting and recording user and application information that is of general use by other local software components, registration and linkage of various local and remote entities including user registration with one or more white pages sites, with one of them designated as the primary site, user registration with a trigger service site, and application registration with each of the user white pages sites.

Figure 5A:
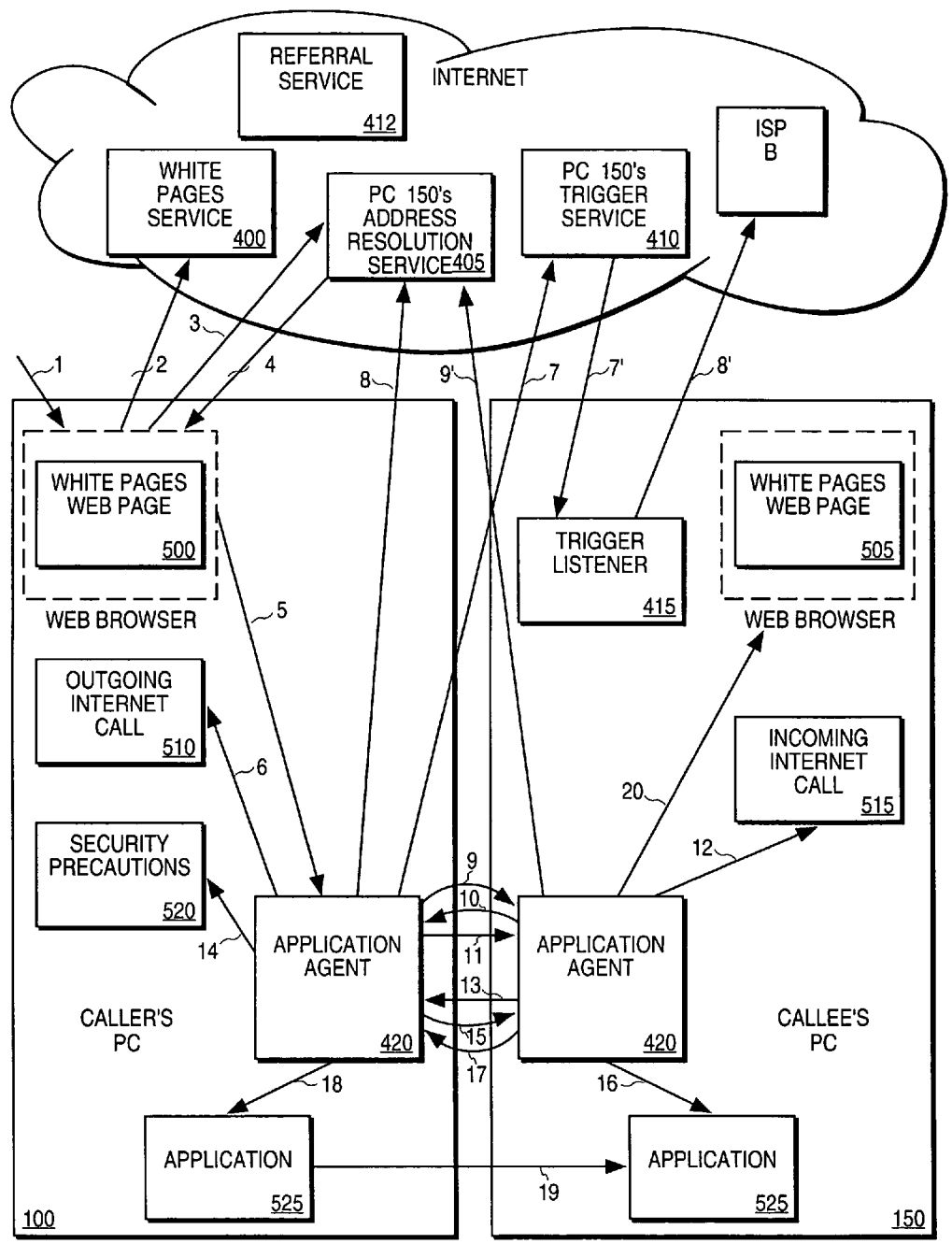
FIG. 5A illustrates in detail the interaction between two PC's connected to the Internet utilizing the claimed invention.

FIG. 5A illustrates one embodiment of the present invention. In step 1, PC 100 is logged into an ISP and the user of PC 100 desires to communicate with the user of PC 150. The user at PC 100 thus brings up a Web browser. In step 2, the user at PC 100 navigates via the Web browser to a Web page, hosted by white pages service 400, that contains information on a user of PC 150. FIG. 5B illustrates an example of a white pages Web page 500. Information contained within the white pages may include name, address, e-mail address and applications available on PC 150. The example applications listed are NetPhone, NetPhoto, and a personal Web site maintained and hosted by the user at PC 150. "NetPhoto" here refers to a generic Internet image exchange application, such as Storm™ Easy Photo Net. The underlined portions of the Web page indicate that the underlined information is an active hyperlink. This active hyperlink allows a user to select the underlined information and automatically cause a predetermined "action." It will be apparent to one of ordinary skill in the art that this predetermined "action" is described by the underlying hyperlink information and can include jumping to another Web page or invoking a service. If the hyperlink is to a Web page, for example, the user's Web browser will automatically jump to the location of the Web page when the hyperlink is selected. If the user of PC 100 desires to communicate via NetPhone and NetPhone is hyperlinked, as in the present example shown in FIG. 5B, clicking on the underlined NetPhone text string will initiate the application connection process for PC 150's NetPhone application.

Referring again to FIG. 5A, as a result of the user of PC 100 clicking on a NetPhone hyperlink for a particular user (i.e. callee at PC 150, in this example), in step 3 a resolve request is issued to PC 150's address resolution service 405. In step 4, address resolution service 405 performs the requested resolve operation which will fail, because in this example, PC 150 is not currently connected to an ISP. The resolve request returns a failure status along with additional contact information pertaining to PC 150. The contact information passed back to PC 100 via address resolution service 405 is based on the parameters specified in the resolve request. The contact information originates from the information stored at white pages service 400 on the user at PC 150. In step 5, according to one embodiment for the present invention, PC 100's Web browser receives the resolve request return information that includes a MIME (Multipurpose Internet Mail Extensions) type that has been set up, in this example, to map to application agent 420. PC 100's Web browser therefore invokes application agent 420 and supplies it with the resolve request return information.

In step 6, application agent 420 on PC 100 examines the resolve request return information supplied to it by PC 100's Web browser. From the information returned by the resolve request, PC 100's application agent 420 determines that PC 150 has to be triggered to log onto an ISP via PC 150's trigger service. PC 100's application agent may display a dialog box to indicate the call progress status and to give PC 100's user an opportunity to abort the pending call and/or save the application contact information for the user at PC 150 in a local HTML based address book for later use.

According to one embodiment of the present invention, application contact information can include an optional URL that points to the Web page of a download site for the application. In this embodiment, if a caller clicks on a hyperlink for an application that is not installed on the caller's own PC, and if this download URL is present in the application contact information, the application agent may display a dialog box indicating that there is a problem and ask the caller if the caller wants the application agent to point the caller's Web browser (a new browser window) to the application's download Web page. If the caller accepts the option to display the application's download Web page, the caller can subsequently download and install the application.

According to another embodiment of the present invention, application contact information can include a refer URL for the callee's referral service. This refer URL can be invoked by PC 100's application agent before triggering to determine whether the application contact process that has been initiated for the callee's application should be redirected to another PC location. If so, PC 100's application agent implements the actual redirection process to another PC location for the given callee using the information returned from the refer request to the callee's referral service. Alternatively, the referral service can be at the callee's PC, accessed only after the callee's PC is triggered and connected to the network to determine where to subsequently contact the target user.

In step 7, PC 100's application agent issues a trigger request for PC 150 to PC 150's trigger service. This trigger request is based on the URL received from white pages service 400, as described above in the white pages service description. PC 150's trigger service queues up the trigger request and returns a trigger I.D. that may subsequently be used by PC 100's application agent to poll the status of the pending trigger request. PC 100's application agent may poll the status of the pending trigger request until PC 150's trigger service indicates that it has been serviced.

In step 8, PC 100's application agent may poll PC 150's address resolution service with resolve requests until one comes back indicating PC 150 is on the Internet. Step 8 must eventually result in a resolve request that yields success before going onto Step 9. If step 8 continues to be unsuccessful after a predetermined period, PC 100's application agent will time out and indicate failure to the user.

Steps 7', 8', and 9' are performed approximately in parallel with steps 7 and 8. In step 7', after step 7, PC 150's trigger service generates a trigger event to PC 150. In any subsequent trigger status request from PC 100's application agent, PC 150's trigger service indicates that the trigger request has been serviced. If the specific trigger technology involved supports two-way information exchange, the trigger service may be able to indicate more about the trigger request, including whether it was actually received and accepted by the intended recipient. In step 8', PC 150's trigger listener detects the trigger event generated by the trigger service. Unless otherwise configured, the trigger listener establishes a dial-up networking connection to PC 150's ISP. The trigger listener informs PC 150's application agent when the networking connection is established. Finally, in step 9' PC 150's application agent registers PC 150 and all of its public Internet applications with PC 150's address resolution service.

If step 8 was successful, in step 9, PC 100's application agent sends a session open command to PC 150's application agent. This session open command may include information about the caller, namely, the user at PC 100, the intended callee, namely the intended user at PC 150, and the initial contact application, in this example NetPhone.

In step 10, PC 150's application agent receives the session open command from PC 100's application agent and caches the information that was sent along with it. Unless otherwise configured, PC 150's application agent sends a session accept response back to PC 100's application agent. In step 11, PC 100's application agent receives the session accept response from PC 150's application agent. PC 100's application agent then sends an application launch command for the NetPhone application to PC 150's application agent.

PC 150's application agent receives the application launch command for NetPhone from PC 100's application agent in step 12. PC 150's application agent displays a dialog box to indicate the incoming application launch request and to give PC 150's user an opportunity to accept, reject, or authenticate the launch request. Although the following description uses a password authentication, a variety of other the authentication mechanisms such as digital certificates or access control lists (ACLs) may also be utilized.

In step 13, assuming PC 150 is not presently attended to by a user to manually accept the NetPhone launch request, a timer expires and PC 150's application agent applies a user timeout policy for NetPhone. In this example, PC 150's application agent sends out a authenticate command back to PC 100's application agent.

In step 14, PC 100's application agent receives the authenticate command from PC 150's application agent. PC 100's application agent may display a password authenticate dialog to allow PC 100's user to enter a user name and password. If PC 100 has previously saved the caller's authentication information for PC 150, the user name and password can be filled in automatically, and PC 100's user may simply click okay to send the saved authentication information.

In step 15, PC 100's application agent sends the caller's authentication information in an authenticate response to PC 150's application agent. In step 16, PC 150's application agent receives the authenticate response from PC 100's application agent, and validates authentication information for the caller at PC 100. For simplicity, in one embodiment of the present invention, only the password is validated. Full access control can also be implemented, requiring validation of a caller against an access control list on PC 150. Assuming that PC 100's password is acceptable, PC 150's application agent launches NetPhone.

In step 17, after NetPhone is loaded and running at PC 150, PC 150's application agent sends an application launch accept response back to PC 100's application agent. In step 18, PC 100's application agent receives the application launch accept response from PC 150's application agent, and then launches NetPhone on PC 100 with information about PC 150. At a minimum, the information about PC 150 includes the network address for PC 150. Information about the callee may also be passed to NetPhone.

In step 19, PC 100's NetPhone automatically tries to establish a network connection to PC 150's NetPhone. PC 150's NetPhone, if unattended by a user, may eventually transition to an answering machine mode in order to record a message made by PC 100's user. If a user had been present at PC 150 in the example sequence above, in step 20, PC 150's application agent could then launch a Web browser window that displays the caller's application contact information. This can occur either as a result of an explicit request by PC 150's user or because NetPhone has been configured for automatic browser launch. PC 150 may then subsequently launch applications at both endpoints by clicking on application hyperlinks on PC 100's application contact page. Thus, according to one aspect of the invention, symmetric launching of one or more applications initiated from either endpoint is supported.

Thus, a method and apparatus for supporting on-demand connectivity for network applications is disclosed. The specific arrangements and methods described herein, are merely illustrative of the principles of the present invention. Numerous modifications in form and detail may be made by those of ordinary skill in the art without departing from the scope of the invention. Although this invention has been shown in relation to a particular preferred embodiment, it should not be considered so limited. Rather, the present invention is limited only by the scope of the appended claims.

The invention claimed is:

1. A method comprising:
connecting a first device to a first service provider of a network, wherein connecting the first device includes logging the first device into the first service provider;
transmitting a trigger request by the first device to a trigger service if a second device is disconnected from the network;
generating a trigger event by the trigger service in response to the trigger request;
transmitting the trigger event to the second device;
connecting the second device to a second service provider of the network in response to the trigger event, wherein connecting the second device includes logging the second device into the second service provider; and
establishing a communication channel between the first device and the second device.

2. The method of claim 1, wherein the first device and the second device are personal computers.

3. The method of claim 1, wherein the network is the Internet.

4. The method of claim 3, wherein establishing the communication channel comprises initiating an Internet connection.

5. The method of claim 4, wherein the Internet connection enables a telephone connection.

6. The method of claim 1, wherein the first service provider and the second service provider are Internet service providers.

7. The method of claim 1, further comprising determining whether the second device is connected to the network.

8. The method of claim 7, wherein determining whether the second device is connected to the network is performed by sending a resolution request to an address resolution service.

9. The method of claim 8, wherein, upon receiving the resolution request, the address resolution service provides a response including whether the second device is connected to the network and, if connected, the network address of the second device.

10. The method of claim 1, further comprising listening for a trigger event from the trigger service.

11. The method of claim 1, wherein the trigger service is connected to the network.

12. A system comprising:
a caller system including a first communicator and caller processing instructions, the first communicator being connected to a computer network, the caller processing instructions including instructions for causing the communicator to generate a trigger request when a called party is not connected to the computer network and instructions for causing the caller system to log into a first network service provider;
a trigger service to receive a trigger request and to generate and transmit a trigger event in response to the trigger request; and
a called party system, the called party system including:
a second communicator for receiving the trigger event from the trigger service,
called party processing instructions, the called party processing instructions including instructions for listening for trigger events when the called party is disconnected from the computer network, and
instructions for causing the called party system to connect with the computer network in response to receipt of the trigger event, wherein the instructions include instructions for causing the called party system to log into a second network service provider.

13. The system of claim 12, wherein the computer network is the Internet.

14. The system of 12, wherein the second service provider comprises a user-specified Internet service provider.

15. The system of claim 12, wherein the called party processing instructions include processing instructions for causing the called party system to establish an Internet connection.

16. The system of claim 12, wherein the trigger service is connected to the computer network.

17. A method comprising:
a step for connecting a first device to a first service provider of a network, wherein connecting the first device includes logging the first device into the first service provider;
a step for transmitting a trigger request to a trigger service when a second device is disconnected from the network;
a step for generating a trigger event by the trigger service in response to the trigger request;
a step for transmitting the trigger event from the trigger service to the second device;
a step for connecting the second device to a second service provider of the network in response to the trigger event, wherein connecting the second device includes logging the second device into the second service provider; and
a step for establishing a communication channel between the first device and the second device.

18. The method of claim 17, wherein the network is the Internet.

19. The method of claim 17, wherein the first device and the second device are computers.

20. The method of claim 17, further comprising a step for listening for a trigger event from the trigger service.

21. The method of claim 17, wherein the trigger service is connected to the network.

22. A system comprising:
a means for connecting a first device to a first service provider of a network, wherein the means for connecting the first device includes means for logging the first device into the first service provider;
a means for transmitting a trigger request to a trigger service when the second device is disconnected from the network;
a means for generating a trigger event by the trigger service in response to the trigger request;
a means for transmitting the trigger event from the trigger service to the second device;
a means for connecting the second device to a second service provider of the network in response to the trigger event, wherein the means for connecting the second device includes means for logging the second device into the second service provider; and a means for establishing a communication channel between the first device and the second device.

23. The system of claim 22, wherein the network is the Internet.

24. The system of claim 22, wherein the first device and the second device are computers.

25. The system of claim 22, further comprising a means for listening for a trigger event from the trigger service.

26. The system of claim 22, wherein the trigger service is connected to the network.

27. A method comprising:
   connecting a first device to a network by logging the first device into a first network service provider;
   determining whether a second device is connected to the network;
   if the second device is disconnected from the network, transmitting a trigger request to a trigger service;
   generating a trigger event in response to the trigger request;
   transmitting the trigger event from the trigger service to the second device;
   detecting the trigger event;
   connecting the second device to the network in response to the trigger event by logging the second device into a second network service provider; and
   establishing a communication channel between the first device and the second device.

28. The method of claim 27, wherein the first device and the second device are personal computers.

29. The method of claim 27, wherein the network is the Internet.

30. The method of claim 29, wherein a trigger request is communicated to the trigger service over the Internet.

31. The method of claim 27, wherein detecting the trigger event is performed by a trigger listener that listens for incoming trigger events.

32. The method of claim 27, wherein the trigger event is generated over a wireless communication medium.

33. The method of claim 27, wherein the trigger event is generated over a switched circuit line.

34. The method of claim 27, wherein determining whether the second device is connected to the network is performed by providing a resolve request to an address resolution service.

35. The method of claim 34, wherein, in response to a resolve request, the address resolution service provides data that includes whether the second device is connected to the network and, if connected, the network address of the second device.

36. The method of claim 35, wherein the address resolution service and the trigger service are linked.

37. The method of claim 36, wherein, if in response to the resolve request the address resolution service determines that the second device is not connected to the network, the address resolution service invokes the trigger service.

38. The method of claim 27, further comprising listening for a trigger event from the trigger service.

39. The method of claim 27, wherein the trigger service is connected to the network.

* * * * *